Figure 1:
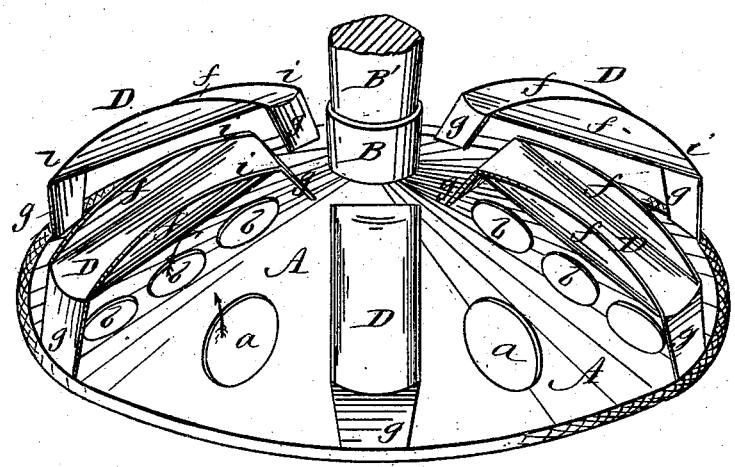

(Model.)

2 Sheets—Sheet 1.

C. FRIEDEBORN.
CHURN DASHER.

No. 256,667. Patented Apr. 18, 1882.

WITNESSES:
C. Neveux
C. Sedgwick

INVENTOR:
C. Friedeborn
BY Munn & Co
ATTORNEYS.

(Model.)
2 Sheets—Sheet 2.
C. FRIEDEBORN.
CHURN DASHER.
No. 256,667. Patented Apr. 18, 1882.
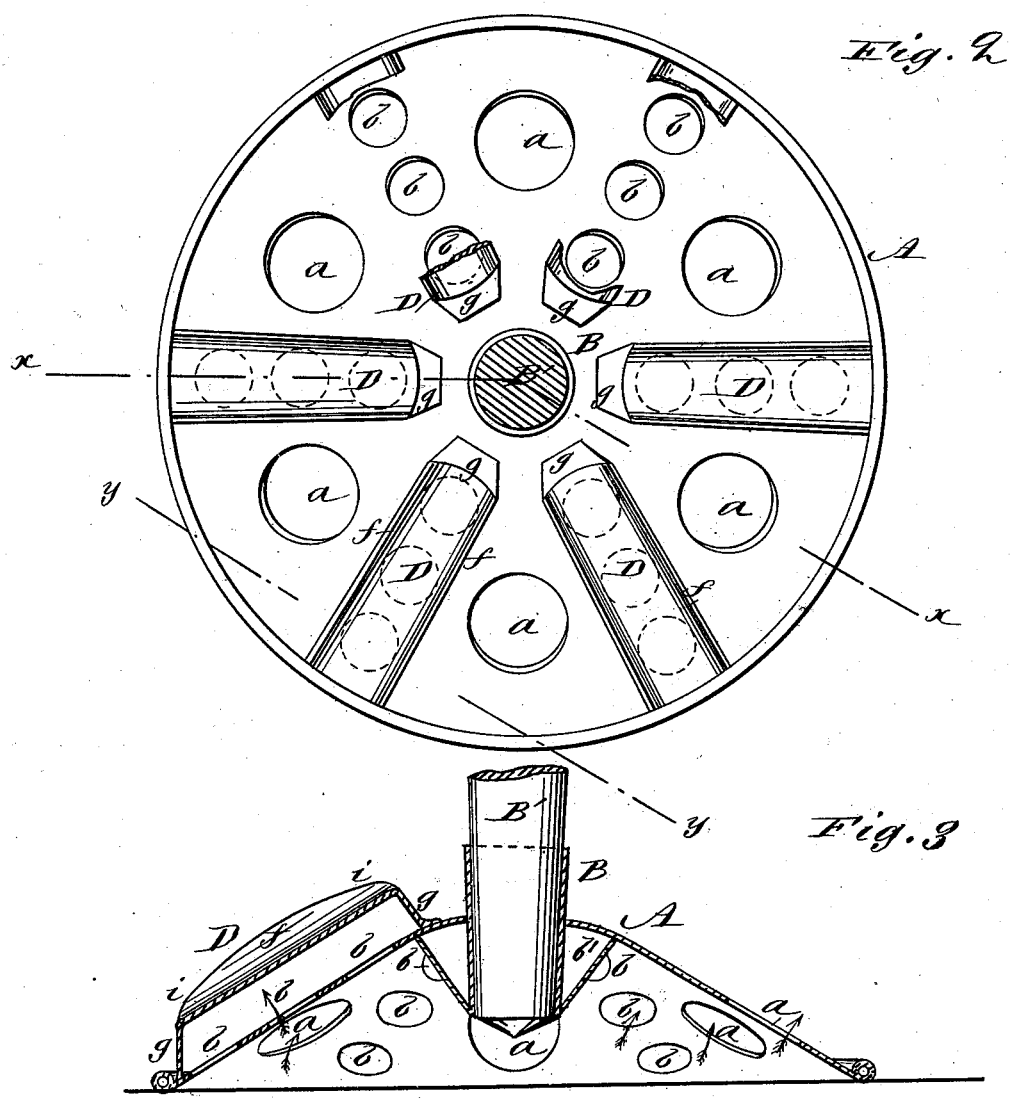
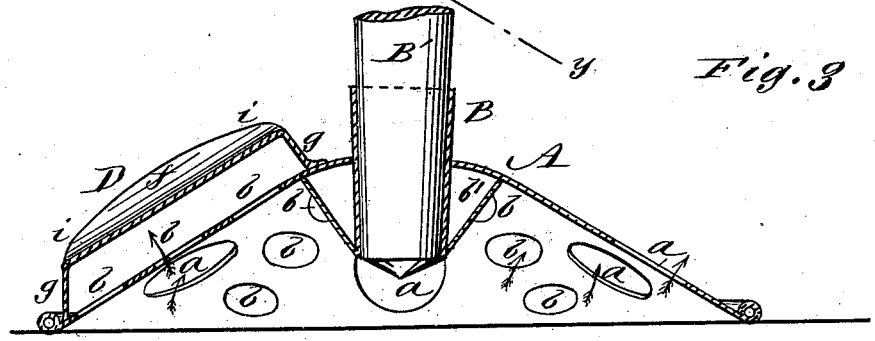
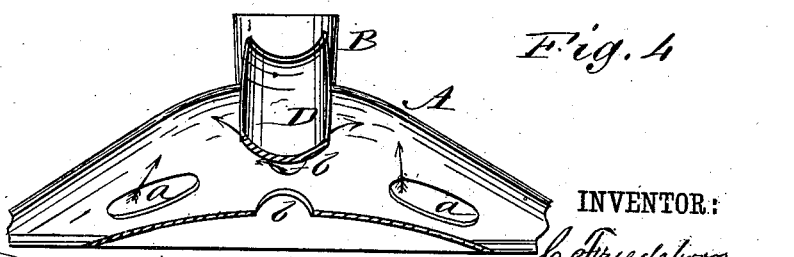
WITNESSES:
C. Neveux
C. Sedgwick
INVENTOR:
C. Friedeborn
BY Munn & Co
ATTORNEYS.

UNITED STATES PATENT OFFICE.

CHARLES FRIEDEBORN, OF CLARE, MICHIGAN.

CHURN-DASHER.

SPECIFICATION forming part of Letters Patent No. 256,667, dated April 18, 1882.

Application filed January 5, 1882. (Model.)

*To all whom it may concern:*

Be it known that I, CHARLES FRIEDEBORN, of Clare, in the county of Clare and State of Michigan, have invented a new and useful Improvement in Churn-Dashers, of which the following is a full, clear, and exact description.

This invention is an improvement on my improved churn-dasher for which Letters Patent No. 207,652 were granted to me September 3, 1878; and the invention consists of concaved agitators or deflectors arranged radially upon the upper conical surface of the plate or main part of the dasher immediately over and a short distance above series of radially-arranged holes made through the said plate, the said plate having suitable holes or passages formed between the radial series of holes, the dasher being made by this construction more efficient, more durable, easier to clean, and cheaper of construction, all as hereinafter more fully described and claimed.

Reference is to be had to the accompanying drawings, forming part of this specification, in which similar letters of reference indicate corresponding parts in all the figures.

Figure 1 is a perspective view of my improved dasher. Fig. 2 is a plan view of the dasher with parts broken away. Fig. 3 is a sectional elevation taken on the line $x\ x$ of Fig. 2, and Fig. 4 is a sectional elevation taken on the line $y\ y$ of Fig. 2.

A represents the conical plate of sheet metal, which is provided at its apex with the sheet-metal tube or socket B for holding the handle B'. This socket is secured in the plate by the inverted sheet-metal truncated cone-shaped plate $b'$ in the same manner as shown and described in my original patent, and the conical plate A is formed with the large holes $a$ and the radial series of smaller holes $b$ in the same manner as in said patent. Radially arranged upon the upper side of the conical plate A over the series of holes $b$ are secured the concaved spoon-shaped agitators or deflectors D D. These deflectors D D are made of sheet metal and are concaved upon their upper side, and the upturned flanges $ff$ thereof are curved or rounded off at the ends of the deflectors, as shown at $i\ i$ in the drawings, and are formed with the downwardly-bent end pieces or supports, $g\ g$, by which the deflectors are soldered upon the upper surface of the main conical plate over the series of holes $b$, as clearly shown in the drawings, and the supports $g\ g$ are of suitable length to support the deflectors a suitable distance above the conical plate A. These deflectors D D, besides their effect to deflect the cream, as hereinafter described, serve also as agitators, circulators, and butter-gatherers. When the dasher is forced down through the body of cream in the churn the deflectors serve to divide and deflect the streams of cream which are forced up through the holes $b$ and cause such streams of cream to come against and mingle with the streams of cream which at the same time issue through the holes $a$ upon both sides of the deflectors, thus causing thorough and violent agitation of the whole mass of cream. Upon the upward movement of the dasher the deflectors D D, owing to their concave or spoon-like shape, and being inclined downwardly and outwardly, lift the cream and cause circulation of the whole mass of cream from the center of the churn outwardly toward the sides or walls of the churn, which circulation brings the whole quantity of cream in rapid succession under the action of the downward movement of the dasher, which causes rapid formation of the butter. The end pieces, $g\ g$, also form walls or abutments for the deflected upward streams of cream forced through the holes $b$ to strike and break against, thus augmenting the general circulation and agitation of the mass of cream, and consequently the rapid formation of butter. When the butter has come and the dasher is used to gather the butter the deflectors have a spoon-like action upon the under side of the globules of butter which rise to the top of the milk in the churn, and serve to collect or concentrate and lift the globules and small lumps of butter to the surface, and to pat them together, and when the dasher is to be removed from the churn for removing the gathered mass of butter the formation of the dasher is such that it can be entirely freed of all small lumps and particles of butter which may adhere to it by simply jarring the dasher slightly upon the edge of the churn, and the dasher can be easily cleaned by simply pouring hot water over and upon it. This easy cleaning and easy freeing of the dasher of particles and small lumps of butter is due to the fact that there are no covered ledges or recesses or holes of any material depth upon the surface of the dasher, and to the fact that the contiguous surfaces of the deflectors and the main plate are both convex, thus making it impossible for any butter to lodge and be retained between them against any jar, however slight.

The deflectors will ordinarily be stamped up in suitable dies and soldered upon the conical main plate, which can be done rapidly at small expense, thus reducing the cost of the dasher.

Having thus fully described my invention, I claim as new, and desire to secure by Letters Patent—

1. The dasher made substantially as herein shown and described, consisting of the apertured conical plate A, having the concaved deflectors D, provided with end supports secured upon its upper surface, substantially as set forth.

2. In combination with the conical plate A, the concaved deflectors D, made as described, and set upon the plate A with their convex faces directly over the openings $b$, as herein shown and described, whereby the jets of cream that rise through the apertures $b$ will be laterally deflected by contact with the convex surfaces of the deflectors and driven into contact with the jets that rise through the adjoining apertures $a$, as set forth.

3. The concaved deflectors D, formed with the supports $g\ g$, and having the upturned flanges $f\ f$, which are curved off, as shown at $i\ i$, the deflectors being secured upon the conical plate A, substantially as and for the purposes described.

CHARLES FRIEDEBORN.

Witnesses:
E. D. WHEATON,
C. W. PERRY.